US010118670B2

(12) United States Patent
Chatterton et al.

(10) Patent No.: US 10,118,670 B2
(45) Date of Patent: Nov. 6, 2018

(54) MONITOR DEVICE

(71) Applicants: Geoffrey W. Chatterton, Santa Clara, CA (US); Seth H. Chatterton, Santa Clara, CA (US)

(72) Inventors: Geoffrey W. Chatterton, Santa Clara, CA (US); Seth H. Chatterton, Santa Clara, CA (US)

( * ) Notice: Subject to any disclaimer, the term of this patent is extended or adjusted under 35 U.S.C. 154(b) by 10 days.

(21) Appl. No.: 15/363,771

(22) Filed: Nov. 29, 2016

(65) Prior Publication Data

US 2018/0148133 A1    May 31, 2018

(51) Int. Cl.
| | |
|---|---|
| *B60L 3/00* | (2006.01) |
| *B60L 15/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B63B 9/00* | (2006.01) |
| *B63B 35/00* | (2006.01) |
| *B63B 15/02* | (2006.01) |
| *B63B 49/00* | (2006.01) |
| *G01L 5/04* | (2006.01) |
| *G01L 1/00* | (2006.01) |
| *G01L 3/00* | (2006.01) |
| *G01L 5/00* | (2006.01) |
| *G08B 1/08* | (2006.01) |

(52) U.S. Cl.
CPC ............... *B63B 9/00* (2013.01); *B63B 15/02* (2013.01); *B63B 35/00* (2013.01); *B63B 49/00* (2013.01); *G01L 5/047* (2013.01); *B63B 2035/009* (2013.01)

(58) Field of Classification Search
CPC .......... B63G 9/00; B63G 15/02; B63G 35/00; B63G 49/00; G01L 5/00; G01L 5/47; G01L 5/047; B63B 9/00; B63B 15/02; B63B 35/00; B63B 49/00
USPC ........................... 701/21; 702/42; 340/539.1
See application file for complete search history.

(56) References Cited

U.S. PATENT DOCUMENTS

2011/0128143 A1* 6/2011 Daniel .................. G06Q 10/08
340/539.1
2014/0180608 A1* 6/2014 Lawrence ............... G06F 15/00
702/42

\* cited by examiner

*Primary Examiner* — Mahmoud S Ismail
(74) *Attorney, Agent, or Firm* — Maschoff Brennan

(57) ABSTRACT

A monitor device includes a memory, a hardware mount configured to attach to a rigging member, a motion sensor configured to detect a first motion characteristic of the rigging member, and a processor operatively coupled to the memory and to the motion sensor. The processor is configured to receive the first motion characteristic from the motion sensor. The processor is further configured to send the first motion characteristic to a controller. The controller is configured to receive a second motion characteristic generate an output for a display based on the first motion characteristic and the second motion characteristic.

14 Claims, 6 Drawing Sheets

MONITOR DEVICE

FIELD

The embodiments discussed herein are related to a monitor device.

BACKGROUND

A typical sailboat includes a mast that is typically supported by 3 to 8 or more steel or synthetic cables collectively known as standing rigging. The tension in each of these cables affects how the mast bends, both statically and under load, which changes the sail shape and may affect performance characteristics.

The subject matter claimed herein is not limited to embodiments that solve any disadvantages or that operate only in environments such as those described above. Rather, this background is only provided to illustrate one example technology area where some embodiments described herein may be practiced. Further, unless otherwise indicated, the materials described in the background section are not prior art to the claims in the present application and are not admitted to be prior art by inclusion in this section.

SUMMARY

According to an aspect of an embodiment, a monitor device includes a memory, a hardware mount configured to attach to a first rigging member, a motion sensor configured to detect a first motion characteristic of the first rigging member, and a processor operatively coupled to the memory and to the motion sensor. The processor is configured to receive the first motion characteristic of the first rigging from the motion sensor. The processor is further configured to send the first motion characteristic to a controller. The controller is configured to receive a second motion characteristic associated with a second rigging member and generate an output for a display based on the first motion characteristic and the second motion characteristic.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
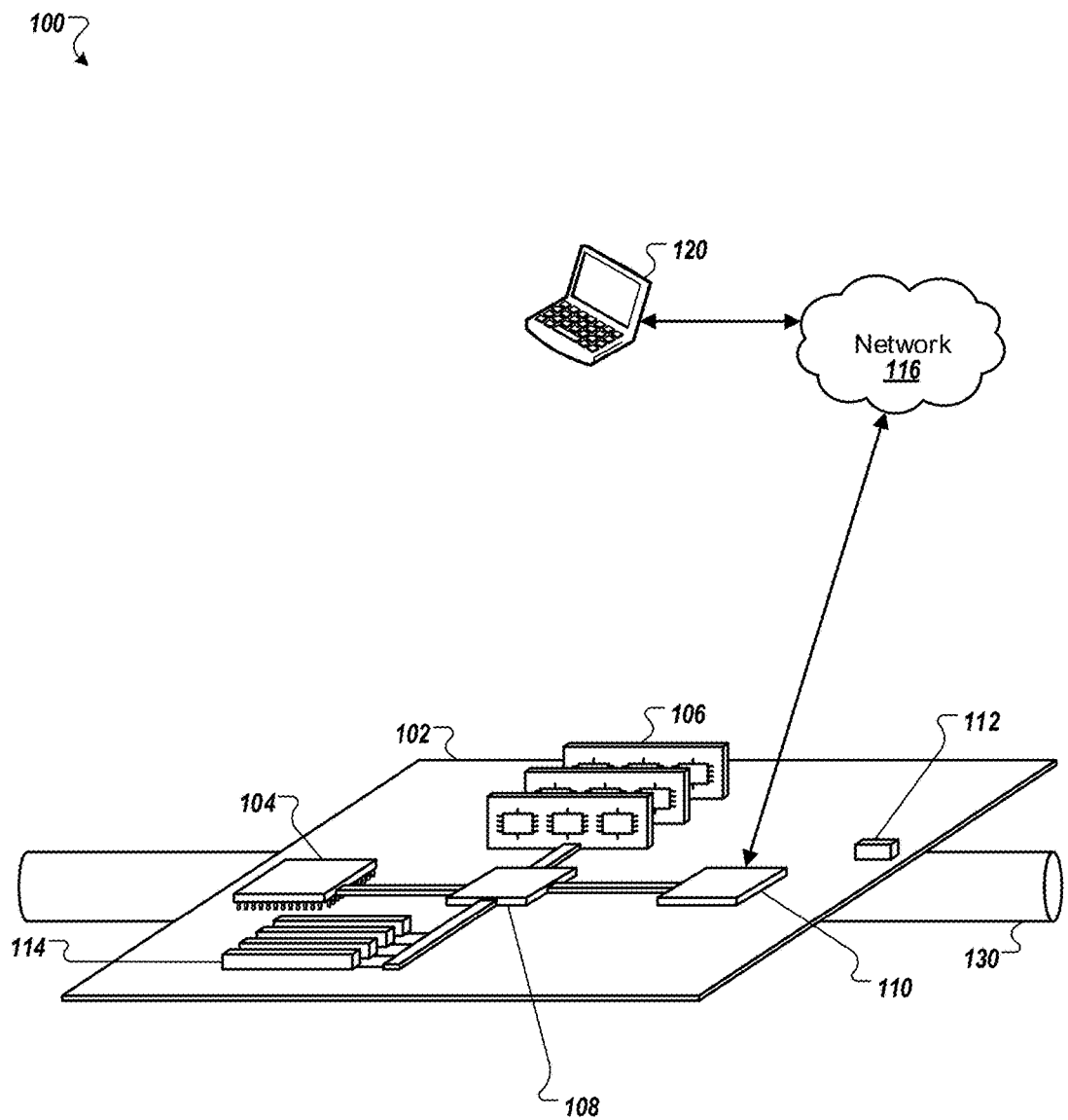
FIG. 1 illustrates an example operating environment that includes a monitor device.

On a typical sailboat, a mast may be supported by steel or synthetic cables (e.g., 2 to 8 or more), which are sometimes referred to as shrouds and stays. Stays may refer to ropes, wires, or rods on sailing vessels that run fore-and-aft to support the mast. Shrouds may refer to ropes, wires, or rods on sailing vessels which support the mast from side to side. The shrouds and stays are collectively known as standing rigging. Individually, each shroud and stay are referred to as a rigging member. The tension in each of these rigging members may affect how the mast bends, both statically and under load, which changes the sail shape and performance characteristics. For optimal performance, sailors may tune their rigs by tensioning each rigging member to specific amounts that match the expected wind conditions. On many racing boats, rig tension is adjusted not just for the conditions of the day, but dynamically for the current point of sail for any number of rigging members.

The most common way to measure rig tension is with a hand-held mechanical tension gauge, such as a Loos Tension Gauge sold by Loos & Co., Inc. Cableware Division of Naples, Fla., that the sailor moves to each shroud or stay in turn as they set up the boat before a day of sailing. Serious racers and crew of high performance sailing craft such as an America's Cup yacht sometimes use load cells to continuously measure and monitor the tension on each piece of standing rigging. These load cells are typically expensive (e.g., hundreds to thousands of dollars per cell, with additional costs for centralized monitoring electronics), and they often require custom rigging work with hardwired thru-hull connections and other invasive installation methods.

Another way to measure rig tension is with a strain gauge. There are a number of different types of strain gauges. Conventional load cells, for example, use electro-mechanical sensors that detect minute variations in electrical resistance due to physical deformation of a carefully calibrated electrical conduit. The tight tolerances required to function properly for sailing applications make these cells relatively expensive. A less common strain gauge is known as a vibrating wire gauge. As in a guitar string, the pitch or frequency of the vibration increases in direct proportion to the tension on the string. Some vibrating wire tension gauges exist, but they are self-contained, calibrated units that are attached to the object being measured for tension in a similar way an electro-mechanical strain gauge would be attached. Conventional vibrating wire tension gauges have many of the same sensitivity and drawbacks issues as other types of strain gauges due to their need to detect tiny changes in an electromagnetic field caused by a moving metallic wire and thus offer no real advantages in sailing applications.

Aspects of the present disclosure address these and other shortcomings of conventional rig tension measurement systems by providing a relatively simple and cheap monitor device that connects wirelessly to a controller (e.g., such as an iPad™) to provide the advantages of a custom load cell integration and monitoring system at a small fraction of the cost and with a relatively fast installation and adjustment time. In addition, due to the real-time nature of the received tension data, the resulting system can provide instantaneous feedback on sailing performance including a quantified impact of adjustments to sailing trim and other tweaks as the crew performs them. The controller may identify forces being applied on a subject (e.g., a sailing vessel). The controller may quantify the forces and provide the force information to a sailor such that the sailor may know how to adjust various features of the sailing vessel, such as rigging member tension. For ease in explanation, the present disclosure may be described with respect to examples pertaining to sailing and sailing vessels. Other applications of the present disclosure outside of sailing and sailing vessels are numerous and may include any system for monitoring motion, such as by using vibrating wire strain gauges used to detect movement in bridges, shifting hillsides, etc.

Some embodiments use the standing rigging itself as a vibrating wire in which to measure. Moreover, instead of using an electro-mechanical coupling to measure a moving conductor, some embodiments include a monitor device with at least one accelerometer mounted on some or all of the shrouds or stays. The accelerometer can include a small and low power semiconductor. Some embodiments of the monitor device also include a processor and a communication component (e.g., a Bluetooth Low Energy (BLE) transceiver) to transfer (e.g., wirelessly or via wire) the data from the accelerometer to the controller. In at least one embodiment, the data obtained by the accelerometer undergoes various digital signal processing to recover the instantaneous fundamental frequency of the piece of rigging to which the accelerometer is mounted, and the relative changes in this frequency over time are converted into the underlying value of the tension changes that the rigging experiences. Such processing can be performed by the monitor device or the controller, or a combination thereof.

The monitor device may be relatively light-weight and may be less prone to affecting oscillation pattern of a sailing vessel as may occur by a monitor device with increased weight. Further the monitor device may not need to be calibrated because it may examine relative tension.

Given that aspects of the present disclosure may now tell an exact tension in each piece of standing rigging, and given that the standing rigging is arrayed around the mast in a known configuration, a monitor device and/or controller can measure both the absolute and relative resultant strain vectors for the collective set of rigging pieces. This allows the system to instantly detect and graphically represent that a heeling force has increased when a sail is trimmed in. More subtly, the system can also instantly quantify how much that change also results in an increase in overall drag or driving force—data which until now has been only crudely estimated in various ways. Due to the 3D nature of the data gathered by intermediate shrouds, for example, the controller can also determine roughly where on the sail the driving force is coming from and whether further adjustments can recapture any non-optimally spilled wind.

In one aspect, a monitor device includes a memory, a hardware mount configured to attach to a first rigging member, a motion sensor configured to detect a first motion characteristic of the first rigging member, and a processor operatively coupled to the memory and to the motion sensor. The processor is configured to receive the first motion characteristic of the first rigging from the motion sensor. The processor is further configured to send the first motion characteristic to a controller. The controller is configured to receive a second motion characteristic associated with a second rigging member and generate an output for a display based on the first motion characteristic and the second motion characteristic.

This and other embodiments are described with reference to the appended figures. In the figures, like numbers generally correspond to like structures unless indicated otherwise.

FIG. 1 illustrates an example operating environment 100 that includes a monitor device 102. The monitor device 102 may be operatively connected to a controller 120 via a network 116. The monitor device 102 may be mountable to a rigging member 130. As illustrated, the monitor device 102 is mounted to the rigging member 130.

The controller 120 may include one or more computing devices, (such as a rackmount server, a router computer, a server computer, a personal computer, a mainframe computer, a laptop computer, a web server, a proxy server, a desktop computer, a tablet computer, a mobile phone, a smartphone, a personal digital assistant (PDA), a wearable device, a virtual reality device, an augmented reality device, or any other suitable computing device, etc.), data stores (e.g., hard disks, memories, databases), networks, software components, and/or hardware components.

In general, the network 116 may include one or more wide area networks (WANs) and/or local area networks (LANs) that enable the monitor device 102 to communicate with the controller 120. In some embodiments, the network 116 includes the Internet, including a global internetwork formed by logical and physical connections between multiple WANs and/or LANs. Alternately or additionally, the network 116 may include one or more cellular RF networks and/or one or more wired and/or wireless networks such as, but not limited to, 802.xx networks, Bluetooth networks, wireless access points, IP-based networks, or the like. The network 116 may also include servers that enable one type of network to interface with another type of network. In at least one embodiment, the network 116 includes a wired connection between the monitor device 102 and the controller 120.

The rigging member 130 may include any object capable of oscillation. The rigging member 130 may be made from any material or materials. In at least one embodiment, the rigging member 130 is metallic. In at least one alternative embodiment, the rigging member 130 is formed from a non-metallic material, such as a synthetic material. The rigging member 130 may include a single solid member or may be made from multiple members. For example, the rigging member 130 may be made from multiple stranded wires or cable, which may be woven or twisted. The rigging member 130 may include a solid rod, or a stranded cable. The density and length of the rigging member 130 may be predetermined or may be calculable values. The rigging member 130 may be any shape and thickness. A cross-section of the rigging member 130 may also be any shape. In at least one embodiment, the thickness and/or cross-sectional geometry of the rigging member 130 may be uniform or may be variable. In at least one embodiment, the cross-section of the rigging member 130 is substantially circular in shape. In at least one embodiment, the rigging member 130 may include structural rigging that holds a mast in place against wind forces being applied to a sail.

The monitor device 102 may include a processor 104, a data storage 106, a motion detector 108, a communication element 110, and a mount feature 112.

In at least one embodiment, the data storage 106 may include a memory (e.g., random access memory), a cache, a drive (e.g., a hard drive), a flash drive, a database system, or another type of component or device capable of storing data. The data storage 106 may also include multiple storage components (e.g., multiple drives or multiple databases) that may span multiple computing devices (e.g., multiple server computers).

The motion detector 108 may include any device or sensor capable of detecting or sensing motion of a rigging member. In at least one embodiment, the motion detector 108 includes an accelerometer, gyroscope, global positioning system (GPS) sensor, etc. The motion detector 108 may detect vibration and/or oscillation of a rigging member to which the monitor device 102 is attached. The motion detector 108 may sample data at any sampling rate, including a high sampling rate. The sampling rate may be configurable and adjustable, such as via a user interface, as further described with respect to FIG. 5.

The communication element 110 may provide any form of wired or wireless communication capability between the monitor device 102 and any other device. In some embodiments, the communication element 110 may include a radio frequency (RF) antenna. By way of example and not limitation, the communication element 110 may be configured to provide, via wireless mechanisms, LAN connectivity, Bluetooth connectivity, Wi-Fi connectivity, NFC connectivity, M2M connectivity, D2D connectivity, GSM connectivity, 3G connectivity, 4G connectivity, LTE connectivity, LTE-Advanced connectivity, any other suitable communication capability, or any suitable combination thereof. The communication element 110 may include any number of communication element 110.

The mount feature 112 may provide attachment capability between the monitor device 102 and any other device to be measured. For example, the mount feature 112 may be used to attach the monitor device 102 to the rigging member 130. Using the mount feature 112, the monitor device 102 may be firmly attached to the rigging member 130 such that the monitor device 102 moves with the rigging member 130 and not independently. Example mount features 112 may include a ziptie, tape, a snap system, a clip, Velcro®, quick release mechanism, fastener (e.g., screw and nut), etc. The monitor device 102 may attach to any location of the rigging member 130. In at least one embodiment, the monitor device 102 may attach may attach half way between connection nodes (e.g., top of the mast and the hull of a boat), or at some other distance between the connection nodes. More than one monitor device 102 may be attached to the rigging member 130. For example, a first monitor device may be attached to the rigging member 130 at a first distance (e.g., 10% of the length of the rigging member 130) from a first connection node and a second monitor device may be attached to the rigging member 130 at a second distance (e.g., 10% of the length of the rigging member 130) from a second connection node. In another example, a first monitor device may be attached to the rigging member 130 on a bottom part of a shroud and a second monitor device may be attached above a spreader on the same shroud. Any number of monitor devices 102 may be mounted to any oscillating object, such as the rigging member 130, or any other wire, line, or cable, etc. of a sailing vessel, or any other system.

In at least one embodiment, the monitor device 102 may include a case (not illustrated) that substantially encloses the processor 104, data storage 106, motion detector 108, and communication element 110. The mount feature 112 may be positioned on an external surface (or integrated with the external surface) of the case. The case may be made of any material, such as plastic, metal, fabric, etc. and may be waterproof, water-resistant and/or breathable.

In operation, the processor 104 of the monitor device 102 may receive motion data via the motion detector 108. In at least one embodiment, the processor 104 may preprocess the motion data in preparation to send the motion data to the controller 120. For example, when using a Bluetooth™ network 116, the monitor device 102 may be configured to send approximately 20 bytes per transaction in a serial UART emulation mode. Other transmission modes, transaction sizes and protocols may be used. In at least one embodiment, the processor 104 may scale the motion data (such as through sending the motion data through a sigmoid function) to decrease range of acceleration while keeping a dynamic range of the motion data close to the same. In at least one embodiment, the processor 104 performs minimal or no preprocessing of the motion data and sends the motion data to the controller 120. In this embodiment, the controller 120 may perform the preprocessing and scaling, among other operations.

In at least one embodiment, the processor 104 of the monitor device 102 may determine a fundamental frequency of the rigging member 130 to which the monitor device 102 is attached. The fundamental frequency may include a lowest frequency produced by an oscillation. In at least one embodiment, the monitor device 102 may determine the fundamental frequency of the rigging member to which the monitor device 102 is attached. For example, a fundamental frequency, $f_1$, may be determined using the equation:

$$f_1 = \frac{\sqrt{\frac{T}{m/L}}}{2L},$$

where T=rigging member tension, m=rigging member mass, and L=rigging member length. In another example, the fundamental frequency of the rigging member 130 may be determined based on measured readings of the motion detector 108. The motion detector 108 may be configured to measure the fundamental frequency of the rigging member 130 to which the monitor device 102 is attached. In at least one embodiment, the monitor device 102 may measure the oscillation pattern of a rigging member. The oscillation pattern may include a combination and/or superposition of all frequencies and harmonics that the rigging can produce at that tension. The monitor device 102 may measure the oscillation pattern of the rigging member by directly monitoring the movement of the wire via the motion detector 108 (e.g., with an accelerometer). From this information, the monitor device 102 may derive the fundamental frequency using various signal processing methods, which may include calculating a periodogram, FFT, power spectral density, etc. Moreover, the oscillation may be measured in multiple ways, including by monitoring a changing electromagnetic field of the vibrating conductor. In at least one embodiment, the oscillation may be measured by listening to sound waves produced, such as in a similar manner that a guitar string works. The monitor device 102 may determine the fundamental frequency of the rigging member 130 at a high sampling rate, such as at 256 samples per second or more. In at least one embodiment, the monitor device 102 may convert the fundamental frequency of the rigging member 130 into a force or tension value, such as by solving the above equation above for Tension and inputting the frequency. The monitor device 102 may also convert the fundamental frequency of the rigging member 130 into a force or tension value at the same or different rate as the rate of sampling the fundamental frequency.

In at least one embodiment, the monitor device 102 may include a notification device, such as a sound emission device or a haptic emission device. The notification device may be configured to emit a notification (e.g., audible, haptic) when a predetermined tension value is achieved. For example, a system administrator may set the predetermined tension value. The monitor device 102 may be attached to the rigging member 130 and may be configured to measure movement or frequency and calculate a tension value based on the measured movement or frequency. The monitor device 102 may compare the measured tension value against the predetermined tension value. When the measured tension value is substantially equal to the predetermined value, the processor 104 may send an instruction for the notification device to provide an alert or notification that the predetermined tension value has been met. In this manner, a system administrator may set a desired predetermined tension value for the rigging member 130, which may aid during the setup of one or more rigging members 130, or may potentially warn of over-tension, breakage and/or a failure.

The controller 120 may receive the motion data (raw or preprocessed) from the monitor device 102. For systems with more than one sailing monitoring device, the controller 120 may identify or locate the sailing monitoring devices and may then receive respective motion data from each of the sailing monitoring devices. The controller 120 may perform various types of analysis on the motion data to ascertain different information. For example, the controller 120 may perform a Fourier transform on the motion data to determine major harmonics of the rigging member 130. The controller 120 may determine the fundamental frequency of the rigging member 130 from a series of harmonic values, for example. The controller 120 may receive and/or calculate 300-400 samples per second in one example. In at least one embodiment, the controller 120 may periodically calculate a group of data (e.g., two seconds worth of information) for every data point. In at least one embodiment, the controller 120 may ping the monitor device 102. Alternatively or additionally, the monitor device 102 may periodically send motion data to the controller 120.

Using the motion data, received from the monitor device 102, the controller 120 may convert a fundamental frequency for each rigging member 130 into a tension value. The tension value may be based on a type of rigging, density, length, etc. The tension value may include a tension vector with a magnitude calculated from the fundamental frequency and a direction based on the physical location and angle geometry of the rigging member.

The controller 120 may combine multiple tension vectors from different monitor devices to determine a resultant force on a subject (e.g., a mast of a sailing vessel). The controller 120 may make this resultant force data available to a user, such as via a graphical user interface, as further described in conjunction with FIG. 5.

Modifications, additions, or omissions may be made to the example operating environment 100 without departing from the scope of the present disclosure. Specifically, embodiments of the environment 100 are depicted in FIG. 1 as including one network 116, one monitor device 102, one rigging member 130, and one controller 120. However, the present disclosure applies to an environment 100 including one or more networks 116, one or more monitor devices 102, one or more rigging members 130, and one or more controllers 120, or any combination thereof.

Moreover, the separation of various components in the embodiments described herein is not meant to indicate that the separation occurs in all embodiments. Additionally, it may be understood with the benefit of this disclosure that the described components may be integrated together in a single component or separated into multiple components.

Figure 2:
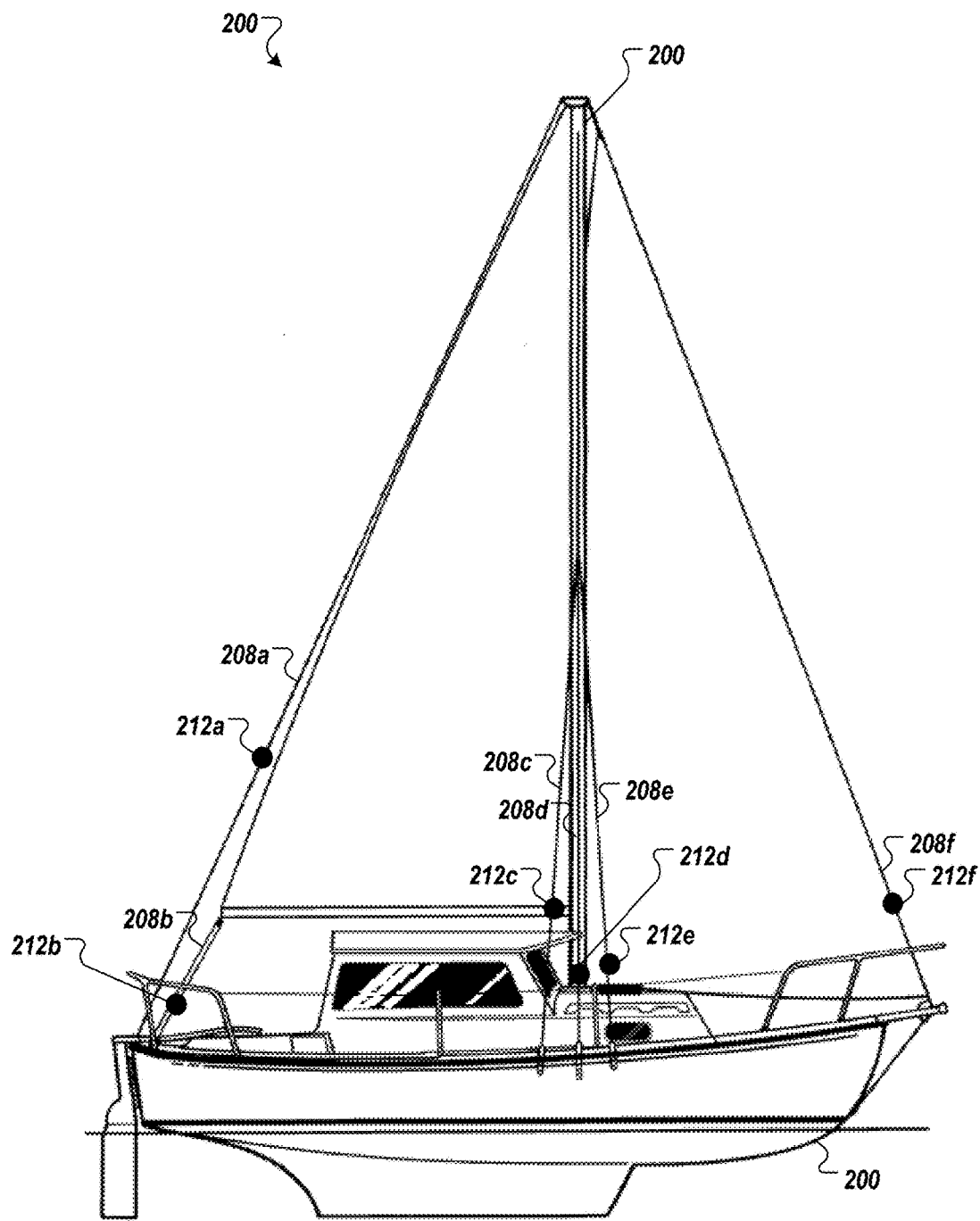
FIG. 2 illustrates an example monitored sailing vessel.

FIG. 2 illustrates an example monitored sailing vessel 200 in accordance to some embodiments. The sailing vessel may include one or more hulls 202, one or more masts 204, one or more sails 206, and one or more rigging members 208. The one or more rigging members 208 may be the same as or similar to the rigging member 130 of FIG. 1. Attached to the one or more rigging members 208 may be one or more sailing monitoring devices 212. The one or more sailing monitoring devices may be the same as or similar to the monitor device 102 of FIG. 1.

As illustrated, the sailing vessel 200 includes six rigging members, 208a, 208b, 208c, 208d, 208e and 208f. Attached to each of the six rigging members 208a, 208b, 208c, 208d, 208e and 208f are sailing monitoring devices 212a, 212b, 212c, 212d, 212e and 212f, respectively. Each of the sailing monitoring devices 212a, 212b, 212c, 212d, 212e and 212f may be communicatively coupled to a controller, such as the controller 120 of FIG. 1. Each of the sailing monitoring devices 212a, 212b, 212c, 212d, 212e and 212f may be configured in a mesh network configuration.

Each of the sailing monitoring devices 212a, 212b, 212c, 212d, 212e and 212f may measure movement of a respective rigging member and transmit any measured movement data to the controller. The controller may track data received from each of the sailing monitoring devices 212a, 212b, 212c, 212d, 212e and 212f. The controller may also compute one or more tension vectors for each of the sailing monitoring devices 212a, 212b, 212c, 212d, 212e and 212f using fundamental frequencies. The tension vectors for each of the sailing monitoring devices 212a, 212b, 212c, 212d, 212e and 212f may correspond to the six rigging members 208a, 208b, 208c, 208d, 208e and 208f. The controller may combine each of the tension vectors to determine a resulting force on the mast 204.

Using the motion data, received from the monitor device 102, the controller 120 may convert a fundamental frequency for each rigging member 130 into a tension value. The tension value may be based on a type of rigging, density, length, etc. The tension value may include a tension vector with a magnitude and direction.

The controller 120 may combine multiple tension vectors from different monitor devices to determine a resultant force on a subject (e.g., a mast of a sailing vessel). The controller 120 may make this resultant force data available to a user, such as via a graphical user interface, as further described in conjunction with FIG. 5.

Figure 3:
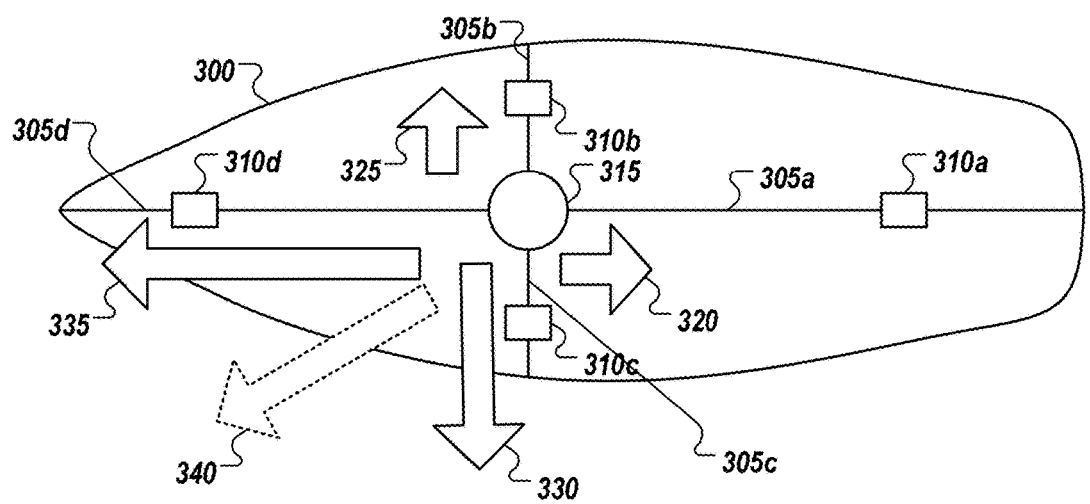
FIG. 3 illustrates another monitored example sailing vessel.

FIG. 3 illustrates another monitored example sailing vessel 300 in accordance to some embodiments. The sailing vessel 300 may include one or more masts 315, one or more sails, and one or more rigging members 305. The one or more rigging members 305 may be the same as or similar to the rigging member 130 of FIG. 1. Attached to the one or more rigging members 305 may be one or more sailing monitoring devices 310. The one or more sailing monitoring devices 310 may be the same as or similar to the monitor device 102 of FIG. 1.

As illustrated, the sailing vessel 300 includes four rigging members, 305a, 305b, 305c, and 305d. Attached to each of the four rigging members 305a, 305b, 305c, and 305d are sailing monitoring devices 310a, 310b, 310c and 310d, respectively. Each of the sailing monitoring devices 310a, 310b, 310c and 310d may be communicatively coupled to a controller, such as the controller 120 of FIG. 1. Each of the sailing monitoring devices 301a, 310b, 301c and 301d may be configured in a mesh network configuration.

Each of the sailing monitoring devices 310a, 310b, 310c and 310d may measure movement of a respective rigging member 305a, 305b, 305c, and 305d and may transmit any measured movement data to the controller. The controller may track data received from each of the sailing monitoring devices 310a, 310b, 310c and 310d. The controller may also compute one or more tension vectors for each of the sailing monitoring devices 310a, 310b, 310c and 310d using fundamental frequencies. The tension vectors for each of the sailing monitoring devices 310a, 310b, 310c and 310d may correspond to the four rigging members 305a, 305b, 305c, and 305d. For example, a first tension vector 320 may correspond to the rigging member 305a and/or the sailing monitoring device 310a. A second tension vector 325 may correspond to the rigging member 305b and/or the sailing monitoring device 310b. A third tension vector 330 may correspond to the rigging member 305c and/or the sailing monitoring device 310c. A fourth tension vector 335 may correspond to the rigging member 305d and/or the sailing monitoring device 310d. The controller may combine the tension vectors 320, 325, 330 and 335 to determine the resulting force vector 340 on the mast 315. The controller may make the tension vectors 320, 325, 330 and 335 and the resultant force vector 340 data available to a user, such as via a graphical user interface, as further described in conjunction with FIG. 5.

Figure 4:
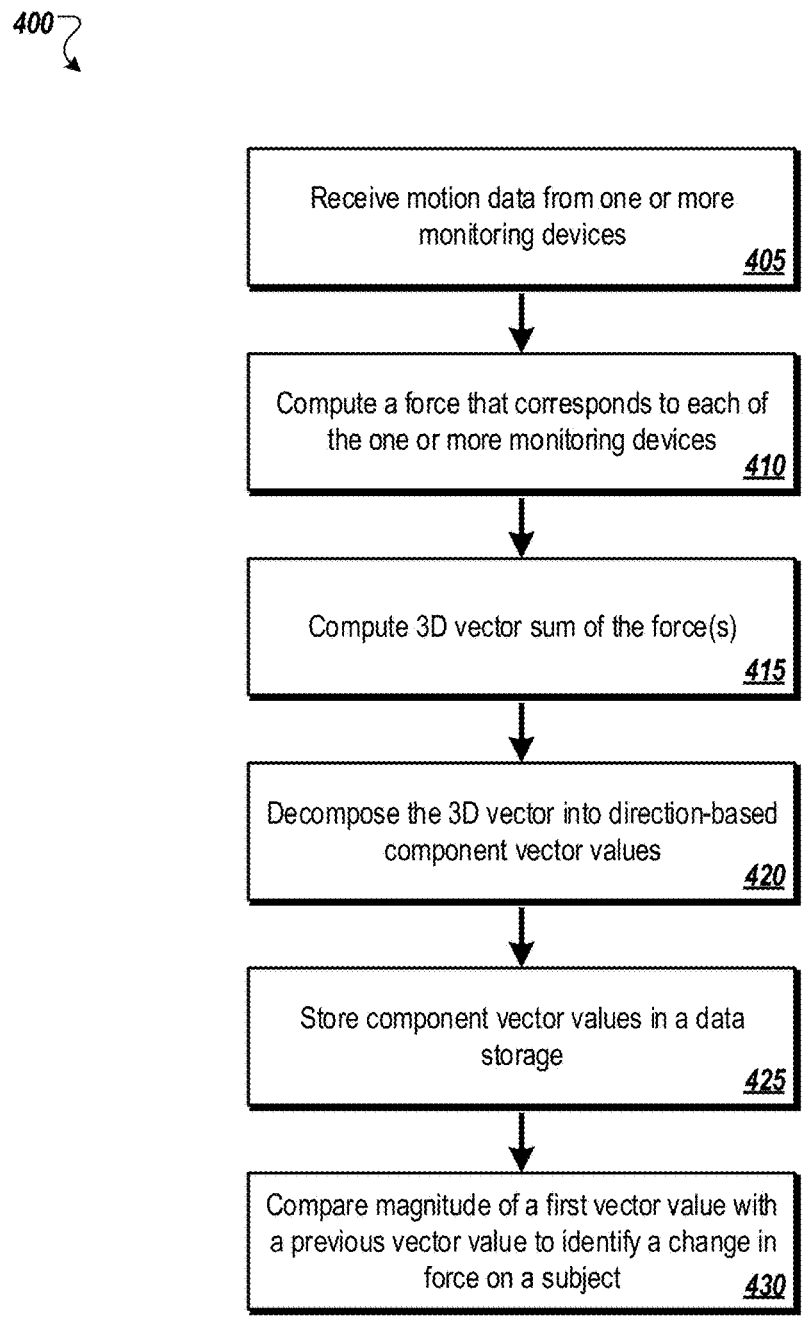
FIG. 4 illustrates an example flow diagram of a method to determine a resulting force vector on a subject using motion data received from one or more monitor devices.

FIG. 4 illustrates an example flow diagram of a method 400 to determine a resulting force vector on a subject using motion data received from one or more monitor devices 102. The methods may be performed by processing logic that may include hardware (circuitry, dedicated logic, etc.), software (such as is run on a general purpose computer system or a dedicated machine), or a combination of both, which processing logic may be included in the monitor device 102, the controller 120, or another computer system or device. For simplicity of explanation, methods described herein are depicted and described as a series of acts. However, acts in accordance with this disclosure may occur in various orders and/or concurrently, and with other acts not presented and described herein. Further, not all illustrated acts may be required to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 400 may begin at block 405, where processing logic may receive motion data from one or more monitoring devices. In at least one embodiment, the motion data may include acceleration data. The processing logic may store the motion data from each of the one or more monitoring devices in separate ring buffers. In at least one embodiment, each of the one or more monitoring devices may send 200-500 samples per second to the processing logic. An analysis window may be 1024 or 2048 samples long. In such instances, each ring buffer may be used as a FIFO to store 2-10 seconds of data.

At block 410, the processing logic may compute a force that corresponds to each of the one or more monitoring devices. In at least one embodiment, the processing logic may compute a force that corresponds to each of the one or more monitoring devices at a calculation interval. The calculation interval may be any period of time, such as a fraction of a second or more. At each calculation interval, the processing logic may compute a tension value or vector for each of the one or more monitoring devices, each corresponding to a segment of rigging.

At block 415, the processing logic may compute a 3D vector sum of the force(s) computed at block 410. The processing logic may compute the 3D vector sum based on geometry and other characteristics of the subject. For example, the processing logic may compute the 3D vector sum based on rigging geometry, rigging material, mast geometry, etc. The rigging geometry, for example, may include a set of information about the 3D relationship between the mast, the boat and each standing rigging component (e.g., length, angle on deck, vertical angle, points of attachment, etc.) In at least one embodiment, the rigging geometry may include one or more predetermined values. A system administrator may, for example, enter the rigging geometry when setting up the system.

At block 420, the processing logic may decompose the 3D vector into direction-based component vector values. In at least one embodiment, the processing logic may decompose the 3D vector into at least two components. For example, the processing logic may decompose the 3D vector into three (e.g., x, y, and z) components: parallel to the boat centerline, perpendicular to the boat centerline, and in column with the mast.

At block 425, the processing logic may store component vector values in a data storage. The component vector values may be stored in relation to a time in which they were measured and/or calculated.

At block 430, the processing logic may compare a magnitude of a first vector value with a previous vector value to identify a change in force on a subject. The first vector value may include a current or most recently measured (or calculated) vector value. The previous vector value may include value that was measured or calculated prior to the first vector value. The previous vector value may be identified using a time stamp that may be stored in association with the previous vector value in the data storage. In at least one embodiment, comparing the magnitude of the first vector value with the previous vector value to identify the change in force on the subject may include comparing a current magnitude of a current parallel component to a previous magnitude of a previous parallel component. An increase in magnitude of the parallel component may indicate that there was an increase in a driving force on the subject (e.g., boat).

In at least one embodiment, comparing the magnitude of the first vector value with the previous vector value to identify the change in force on the subject may include comparing a current magnitude of a current perpendicular component to a previous magnitude of a previous perpendicular component. An increase in magnitude of the perpendicular component may indicate that there was an increase in a heeling force on the subject (e.g., boat).

At block 435, the processing logic may provide one or more vector values on a display, such as via a graphical user interface (GUI). Several displays, windows, or indicators may be used. Example displayed information may include: the computed force values per rigging segment, a resultant force of a sum of forces, a decomposed resultant separating heeling and driving force, or a change in a decomposed driving/heeling resultants, among others.

For this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

Figure 5:
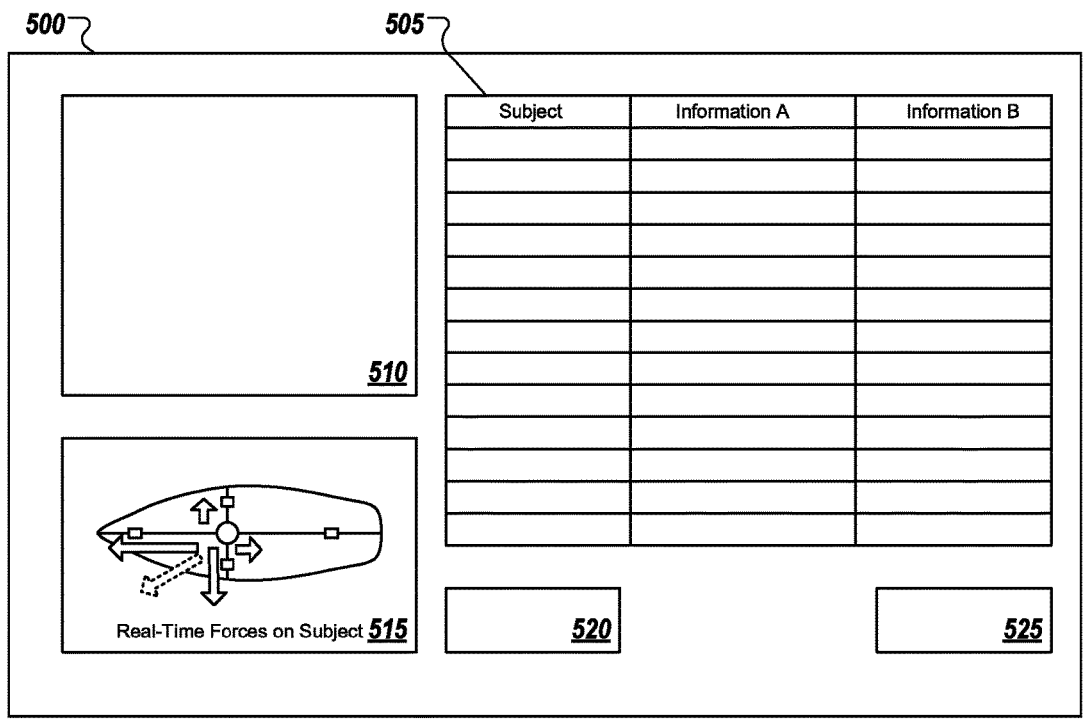
FIG. 5 illustrates an example graphical user interface.

FIG. 5 illustrates an example graphical user interface 500. The graphical user interface 500 may be part of a user interface provided to a user via a display device. The graphical user interface 500 may represent a visual depiction of one or more information panes 505, 510, 515 that relate to measurement of a subject. For example, when the subject includes a sailboat, the graphical user interface 500 may include one or more information panes 505, 510, 515 that relate to one or more measurements pertaining to the sailboat.

As illustrated, information pane 505 may be configured to display raw data pertaining to a subject. In at least one embodiment, the information pane 505 may display data in a tabular format. A displayed table may include any number of columns and rows as well as a header. For example, the information pane 505 includes a header to label columns. The example columns may include a subject, information A and information B. The subject may indicate a particular subject (e.g., an individual rigging member), the information A can include first information about the subject on the same row and the information B can include second information about the subject on the same row. For example, the subject may be a first rigging member of a sailboat, the information A may indicate a real-time (or previously recorded) force or tension magnitude and information B may indicate a real-time (or previously recorded) direction or angle. In at least one embodiment, the information pane 505 may illustrate computed force values per rigging segment (which may be marked or flagged if excess tension is present), a resultant force of a sum of forces, a decomposed resultant separating heeling and driving force, or a change in a decomposed driving/heeling resultants, among others.

As illustrated, information pane 510 may be configured to display subject data. For example, the information pane 510 may indicate an overall subject (e.g., a sailboat make, model) and/or sub-subjects (e.g., individual rigging members). In a specific example, the information pane 510 may indicate characteristics of one or more sub-subjects, such as length, material, diameter, and other properties of each individual rigging member of the sailboat. The information pane 510 may also include summary information, such as an overall magnitude and direction of force on a subject or sub-subject.

As illustrated, information pane 515 may be configured to display a graphical representation of a subject and/or sub-subjects. As illustrated, the information pane 515 includes a top down view of a sailboat, similar to the sailing vessel 300 of FIG. 3. The information pane 515 may include graphical representations of component force vectors on each of a group of subjects (e.g., rigging members), as further described in conjunction with FIG. 3. The information pane 515 may also graphically illustrate a resulting magnitude and direction of an overall force on the subject. In at least one embodiment, the information pane 515 may graphically illustrate computed force values per rigging segment (which may be marked or flagged if excess tension is present), a resultant force of a sum of forces, a decomposed resultant separating heeling and driving force, or a change in a decomposed driving/heeling resultants, among others. For example, an arrow may be colored in red (or in any other color) if the corresponding force is above a predetermined force threshold value.

The graphical user interface 500 may also include various buttons or toggles 520, 525. For example, button 520 may be a toggle to switch between a first mode and a second mode. The first mode may include a setup mode and the second mode may include a run mode.

When in the setup mode, the graphical user interface 500 may be configured to present setup information and receive input related to setting up a subject. The input may be provided by the user through a graphical user interface tool, such as providing text to a text field, a selection of an item in a drop down box, or a selection (or deselection) of a check box, etc. For example, the setup mode can be used to configure rigging tension on a sailboat before going sailing. A user, for example, may enter various characteristics of a boat (e.g., a make, model, lengths of masts, rigging, etc.). In at least one embodiment, upon receiving a make and model of a boat, the controller may identify various properties of the boat, including mast and rigging geometry, among other features.

Once the geometric properties of the subject or subjects are known, the controller may calculate desired tension values for each rigging member. The desired tension values may be displayed on the graphical user interface 500. A sailor may tighten each of the rigging members to the respective tension value, as indicated on the graphical user interface 500. In at least one embodiment, the controller may determine tension values based on expected or predetermined sailing conditions (e.g., wind, sea state). In at least one embodiment, the controller may identify current tension values of each rigging member and calculate a tighten value for each rigging member and a sequence in which a sailor may tighten each rigging member. The tighten value may be a different value than a final tension value for each rigging member. For example, a first tension on a first rigging member may be affected by a second tension of a second rigging member such that the first tension increases as the second tension increases. Thus, a first tighten value for the first rigging member may be different than a final tension value for the first rigging member. The final tension value for the first rigging member may be the tension value for the first rigging member once each of the other rigging members are tightened. In this manner, a sailor may tighten each of the rigging members to their respective tighten values and when the sailor has tightened all of the rigging members, the resulting and final tension in each rigging member is the desired tension. In this manner, a sailor may tighten each rigging member once to be ready for sailing as compared to conventional approaches that include multiple iterations of tightening each rigging member to achieve the desired final tension. In at least one embodiment, the controller may send the first tighten value and/or the final tension value for each rigging member to the respective monitor device 102. Each monitor device 102 may include an indicator, such as a light, speaker, haptic emitter, etc. that provides a notification once the desired tension value has been met. In at least one embodiment, a first notification may indicate a first tension and a second notification may include a second tension. For example, first notification (e.g., a single flash of light, a single audible beep) may indicate a first tension (e.g., a first tighten value) and a second notification (e.g., a double flash of light, a double audible beep) may include a second tension (e.g., a final tension value).

During the setup and/or the run modes, the graphical user interface 500 may display tension values for each rigging member in real-time. For example, the information pane 515 may include numbers by the arrows to show values as they change either due to user tightening or due to external forces (e.g., wind). The numbers may change based on actual changes in force. Similarly, the length of the arrows may change based on actual changes in force and the direction of the arrows may change based on actual changes in direction.

Any of the information or data or graphical features of the graphical user interface 500 may be in a different shading, color, texture, or other visual representation to distinguish some data from other data (e.g., when tension values are above a threshold value, when data is not being received from an expected monitor device 102).

In at least one embodiment, the graphical user interface 500 may present external data, such as wind data, temperature data, apparent wind angle data, etc. In at least one embodiment, the controller 120 may connect to an external data source (e.g., another on-board sensor, an external source, a cloud-based source) to obtain the external data. In at least one embodiment, the controller 120 some or all of the data received and/or calculated to an external system, such as for use in a chart plotter of a boat. In at least one embodiment, the controller 120 may connect to an NMEA 2000 bus and provide and receive data via the NMEA 2000 bus.

The graphical user interface 500 and/or the controller 120 may be used to detect faults in a system. For example, once a system is setup, it may expect to communication with a certain number of monitor devices 102. In the event that the controller 120 detects that it is receiving data from that fewer than the expected number of monitor devices 102, the controller 120 may attempt to reconnect to the missing monitor device 102. In at least one embodiment, the controller may send a notification to a sailor of the missing monitor device 102, such as via the graphical user interface 500.

Modifications, additions, or omissions may be made to FIG. 5 without departing from the scope of the present disclosure. For example, the graphical user interface 500 may include more or fewer elements than those illustrated and described in the present disclosure.

Figure 6:
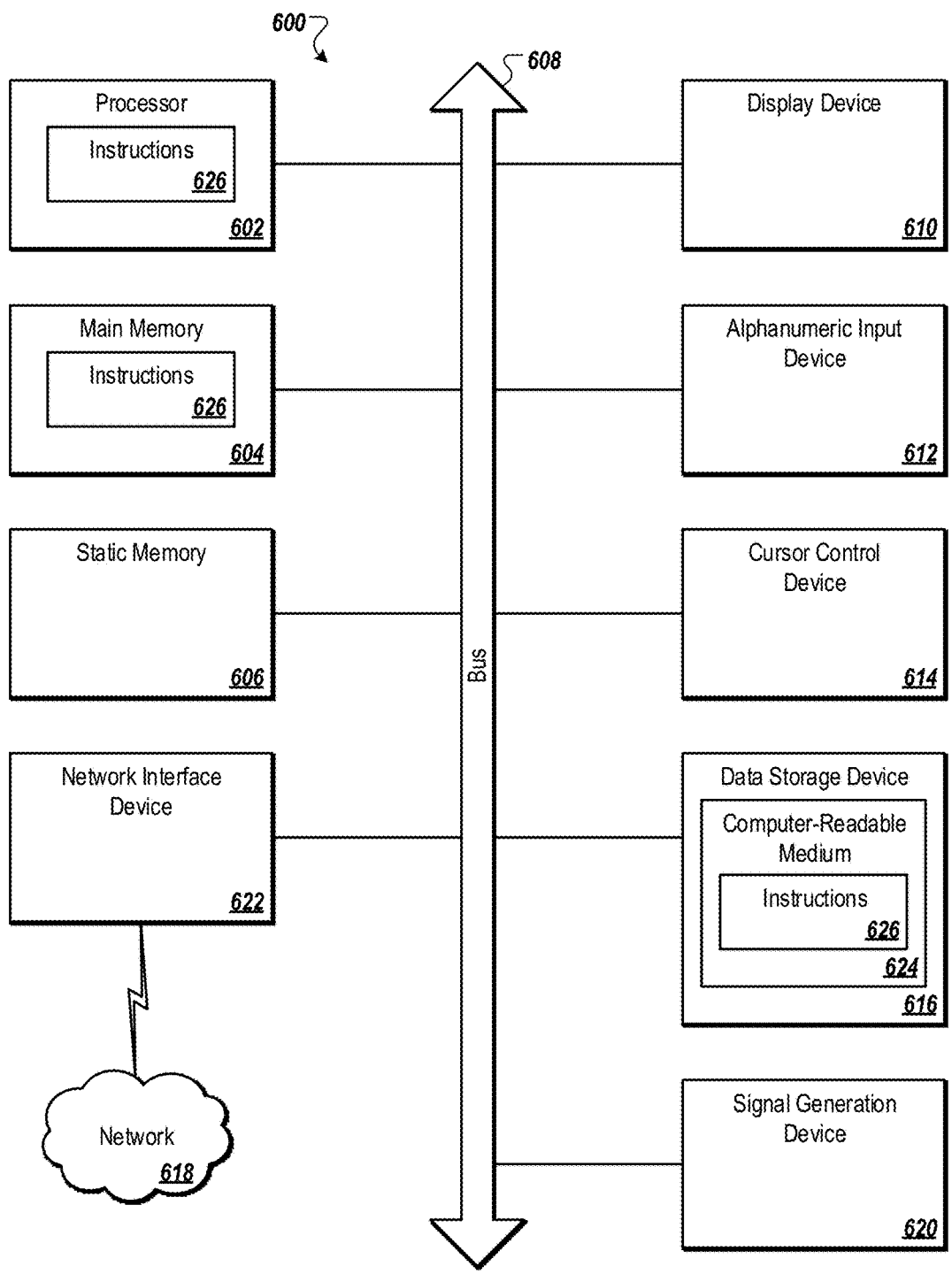
FIG. 6 illustrates a diagrammatic representation of a machine in an example form of a computing device within which a set of instructions, for causing the machine to perform any one or more of the methods discussed herein, may be executed.

FIG. 6 illustrates a diagrammatic representation of a machine in the example form of a computing device 600 within which a set of instructions, for causing the machine to perform any one or more of the methods discussed herein, may be executed. The computing device 600 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 600 includes a processing device (e.g., a processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)) and a data storage device 616, which communicate with each other via a bus 608.

Processing device 602 represents one or more general-purpose processing devices such as a microprocessor, central processing unit, or the like. More particularly, the processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also include one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computing device 600 may further include a network interface device 622 which may communicate with a network 618. The computing device 600 also may include a display device 610 (e.g., a liquid crystal display (LCD) or a cathode ray tube (CRT)), an alphanumeric input device 612 (e.g., a keyboard), a cursor control device 614 (e.g., a mouse) and a signal generation device 620 (e.g., a speaker). In one implementation, the display device 610, the alphanumeric input device 612, and the cursor control device 614 may be combined into a single component or device (e.g., an LCD touch screen).

The data storage device 616 may include a computer-readable storage medium 624 on which is stored one or more sets of instructions 626 embodying any one or more of the methods or functions described herein. The instructions 626 may also reside, completely or at least partially, within the main memory 604 and/or within the processing device 602 during execution thereof by the computing device 600, the main memory 604 and the processing device 602 also constituting computer-readable media. The instructions may further be transmitted or received over a network 618 via the network interface device 622.

While the computer-readable storage medium 626 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Terms used herein and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Further, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it may be understood that the various changes, substitutions, and alterations may be made hereto without departing from the spirit and scope of the present disclosure.

What is claimed is:

1. A system, comprising:
   a monitor device being configured to couple to a rigging member, the monitor device being configured to measure motion of the rigging member;
   a controller operatively coupled to the monitor device, the controller being configured to:
      receive first motion data from the monitor device coupled to the rigging member and second motion data from the monitor device;
      compute a first force that corresponds to the first motion data and a second force that corresponds to the second motion data;
      compute a 3D vector based on the first force and the second force;
      decompose the 3D vector into at least a first direction-based component vector value;
      compare a magnitude of the first direction-based component vector value with a magnitude of a previous vector value to identify a change in force on a subject; and
      update a graphical user interface of a display device based on the change in force on the subject.

2. The system of claim 1, wherein the controller is configured to periodically receive the first motion data and second motion data from the monitor device at least once every five seconds.

3. The system of claim 1, wherein the controller is configured to periodically receive the first motion data and the second motion data from the monitor device at least twice every second.

4. The system of claim 1, wherein the first force corresponds to a first tension in the rigging member, and wherein the second force corresponds to a second tension in the rigging member.

5. The system of claim 1, wherein the 3D vector is computed based on geometry or a material of the subject, or the rigging member.

6. The system of claim 1, wherein when decomposing the 3D vector into at least the first direction-based component vector value, the controller is configured to decompose the 3D vector into three components.

7. The system of claim 1, wherein when comparing the magnitude of the first vector value with the previous vector value to identify the change in force on the subject, the controller is configured to compare a current magnitude of a current parallel component to a previous magnitude of a previous parallel component, wherein an increase in magnitude of the parallel component is indicative of an increase in a driving force on the subject.

8. The system of claim 1, wherein when comparing the magnitude of the first vector value with the previous vector value to identify the change in force on the subject, the controller is configured to compare a current magnitude of a current perpendicular component to a previous magnitude of a previous perpendicular component, wherein an increase in magnitude of the perpendicular component is indicative of an increase in a heeling force on the subject.

9. A method comprising:
  receiving first motion data from a first monitor device coupled to a first rigging member and second motion data from a second monitor device coupled to a second rigging member;
  computing a first force that corresponds to the first motion data and a second force that corresponds to the second motion data;
  computing a 3D vector based on the first force and the second force;
  decomposing the 3D vector into at least a first direction-based component vector value;
  comparing a magnitude of the first direction-based component vector value with a magnitude of a previous vector value to identify a change in force on a subject; and
  updating a graphical user interface of a display device based on the change in force on the subject.

10. The method of claim 9, wherein the first force corresponds to a first tension in the first rigging member, and wherein the second force corresponds to a second tension in the second rigging member.

11. The method of claim 9, wherein the 3D vector is computed based on geometry or a material of the subject, the first rigging member, or the second rigging member.

12. The method of claim 9, wherein decomposing the 3D vector into at least the first direction-based component vector value comprises decomposing the 3D vector into three components.

13. The method of claim 9, wherein comparing the magnitude of the first vector value with the previous vector value to identify the change in force on the subject comprises comparing a current magnitude of a current parallel component to a previous magnitude of a previous parallel component, wherein an increase in magnitude of the parallel component is indicative of an increase in a driving force on the subject.

14. The method of claim 9, wherein comparing the magnitude of the first vector value with the previous vector value to identify the change in force on the subject comprises comparing a current magnitude of a current perpendicular component to a previous magnitude of a previous perpendicular component, wherein an increase in magnitude of the perpendicular component is indicative of an increase in a heeling force on the subject.

* * * * *